Dec. 27, 1938. L. LARSEN 2,141,538
BABY CARRIAGE
Filed April 13, 1936 2 Sheets-Sheet 1

Witness:
E. Camporini

Inventor:
Lewis Larsen,
By: Arthur W. Nelson
Attorney.

Dec. 27, 1938.  L. LARSEN  2,141,538
BABY CARRIAGE
Filed April 13, 1936   2 Sheets-Sheet 2
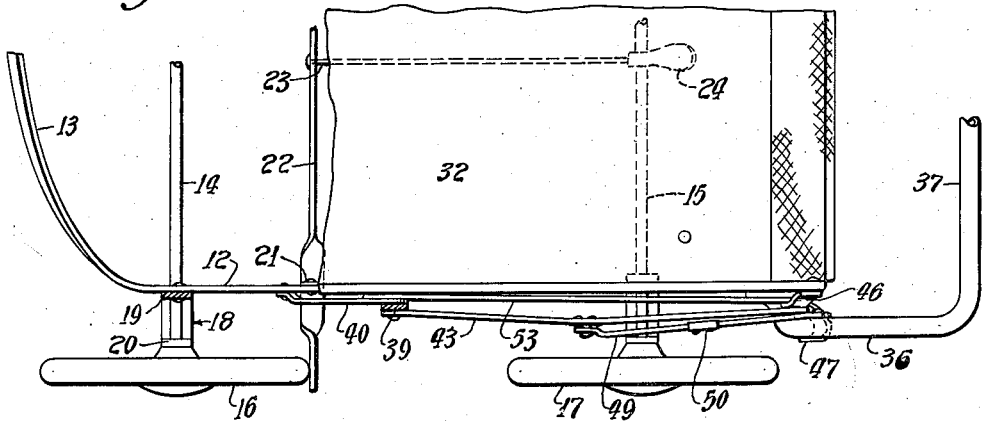
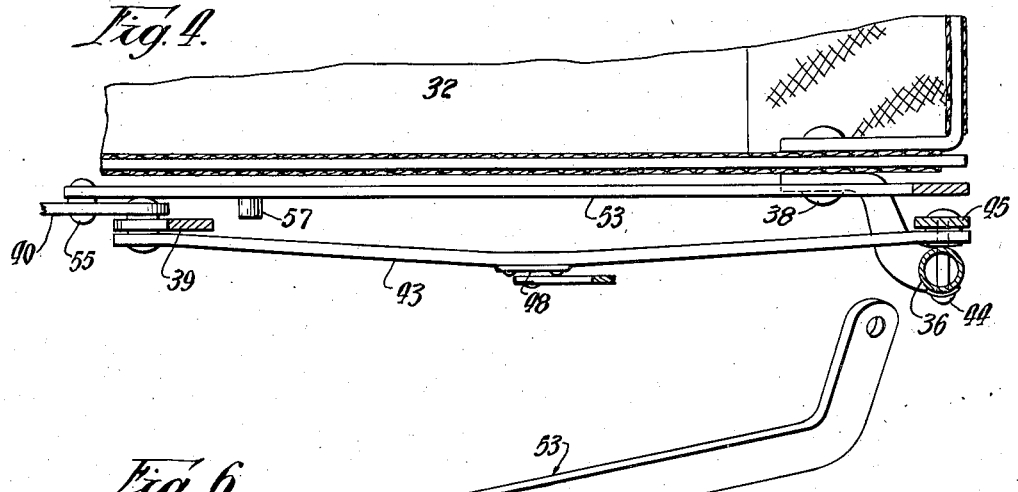
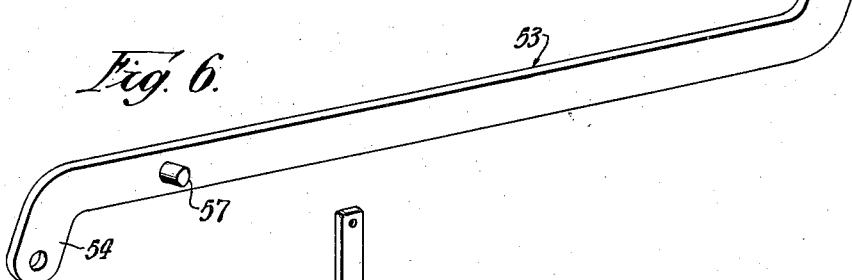
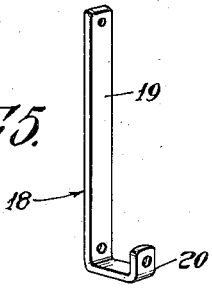
Inventor:
Lewis Larsen,
Attorney.

Patented Dec. 27, 1938

2,141,538

UNITED STATES PATENT OFFICE 2,141,538

BABY CARRIAGE

Lewis Larsen, Menominee, Mich., assignor to Heywood-Wakefield Company, Gardner, Mass., a corporation of Massachusetts Application April 13, 1936, Serial No. 74,088

11 Claims. (Cl. 280—36)

This invention relates to improvements in baby carriages and it consists of the matters hereinafter described and more particularly pointed out in the appended claims.

One of the objects of the present invention is to provide a baby carriage which may be readily collapsed or folded to occupy but a minimum amount of space for storage or for carrying in an automobile and which carriage may be as readily set up or extended into a condition for use.

Another object of the invention is to provide a baby carriage of this kind which is inexpensive to produce; which is relatively light in weight but strong and rigid and which is trim and neat in appearance when used for its intended purpose.

A further object of the invention is to provide a carriage of this kind including a body of such flexibility that it may be collapsed upon itself and then folded down upon its associated wheel frame to reduce the carriage to its minimum dimensions.

The above mentioned objects of the invention as well as others, together with the several advantages thereof will more fully appear as I proceed with my specification.

In the drawings:

Fig. 3 is a fragmentary view partly in plan elevation and partly in horizontal section when the carriage is in its extended condition, a portion of said figure showing the body and associated parts and the other portion showing the wheel frame and associated parts.

Fig. 4 is a horizontal detail sectional view through a part of the rear end of the body and associated linkage on an enlarged scale as taken on the line 4—4 of Fig. 1.

Fig. 5 is a perspective view of one of a plurality of arms or members whereby the body is supported from the wheel axles.

Fig. 6 is a perspective view of one of a pair of certain links employed in the carriage and which will be more fully mentioned later.

Figure 1:
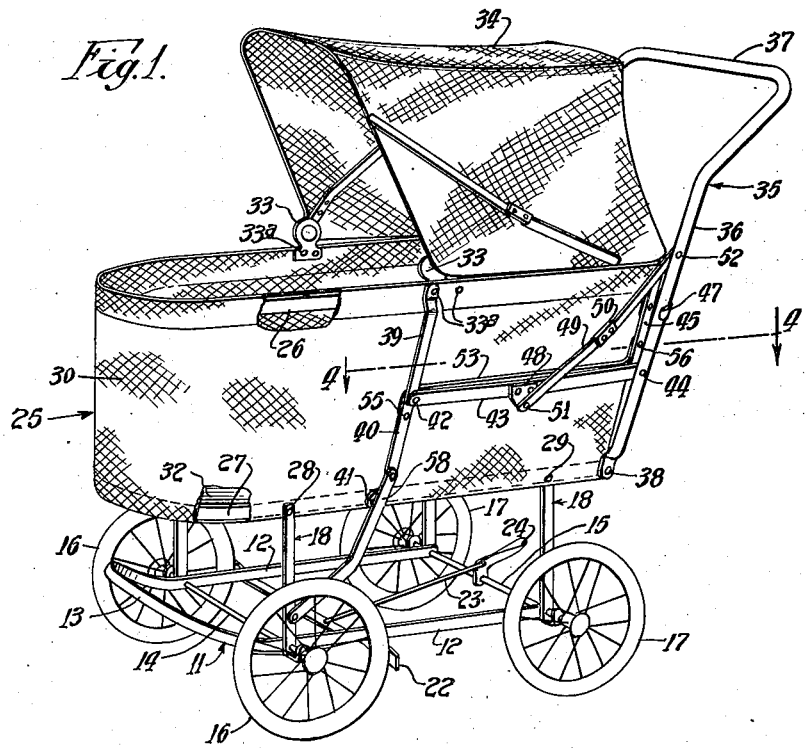
Fig. 1 is a perspective view of the carriage in its set-up or extended condition ready for use.

Referring now in detail to that embodiment of the invention illustrated in the drawings:

10 indicates as a whole the chassis of the carriage which includes a U-shaped frame 11 of edgewise arranged strap iron. The frame 11 includes longitudinal side members 12—12 which are connected together at the front end of the carriage by a cross bar 13. The front ends of the side members 12—12 are bent upwardly to bring the cross bar into an elevated position more convenient for grasping when necessary.

14 and 15 indicate the front and rear axles of the carriage and which axles extend through and a suitable distance beyond associated openings in the side members 12—12 of the frame 11. Journaled on the ends of said axles are the front and rear wheels 16 and 17 respectively. Turnably mounted on the ends of the axles between the side members 12 and the wheels 16 and 17 are body-supporting members 18, one of which best appears in perspective in Fig. 5. Each member 18 includes an arm 19 with a laterally bent and offset bottom end 20, the associated axle end extending through suitable openings in said arm and said end respectively. The bottom end of each body-supporting member thus spaces its associated wheel from the adjacent side frame member 12.

A bracket 21 (see Fig. 3) is secured to each side frame member 12 a suitable distance rearwardly of the front axle. To these brackets, portions of a transverse brake bar 22 are pivoted. The end and intermediate portions of said bar are bent to bring their edges into a vertical plane. The intermediate portion of said bar is relatively flexible and has secured thereto the front end of an actuating rod 23. This rod is located in the median plane of the carriage as a whole, and its rear end is pivotally connected to a foot lever 24 pivoted on the rear axle. When the lever is depressed, this bows the mid portion of the bar rearwardly to cause the end portions of the bar to swing forwardly and engage the tires of the front wheels with a braking action.

25 indicates as a whole, the body of the carriage. Said body includes top and bottom rigid frames 26 and 27 made of edgewise disposed strap iron. The top frame is somewhat longer than the bottom frame so that the rear end of the top frame overhangs the like end of the bottom frame. The top ends of the arms 19 of both the front and rear members 18 are pivotally connected to associated side members of the body bottom frame 27 as at 28—29. Preferably the top ends of the arms 19 of the front members 18 are disposed upon the outside of said frame members and the top ends of the arms 19 of the rear members 18 are disposed on the inside of said frame members.

Associated with the top and bottom frames

26—27 is a body fabric 30. This fabric has suitable top and bottom hems to receive the respective frames 26—27. Preferably this fabric which extends around the sides and both ends of the body, is of a good strong wear-resisting material, capable of folding in pleats without cracking or wrinkling. With the rear end of the top frame overhanging the like end of the bottom frame as before mentioned, the rear end of the body fabric takes on an upward and rearward inclination.

The body has a bottom 32 made of a comparatively rigid but light weight material. This bottom is suitably secured to and is supported by the body bottom frame 27.

At about the middle of each side member of the body top frame 26, is a hood bracket 33, each bracket being secured in place by a pair of rivets 33ª. A folding hood 34 is mounted on said brackets in any suitable manner so that the same need not be illustrated or described in detail.

At the rear end of the carriage is the usual push handle indicated as a whole at 35. This handle which is substantially of an inverted U shape includes side arms 36—36 and a connecting member 37 at the top. The bottom end of each arm of the handle is pivoted as at 38 to the rear end of the side members of the body bottom frame 27. The side arms 36—36 take on the same inclination as the rear end of the body fabric 30.

At each side of the body and toward the rear end thereof is a suitable linkage arrangement which in one position holds the body in its extended condition for use. This linkage however, may be manipulated to permit the collapsing or folding of the top frame 26 of the body down toward the bottom frame 27, with the body fabric folding in between said frames as pleats. As the linkage at both sides of the body is the same, a description of the linkage at one side should suffice for both.

39 and 40 indicate the top and bottom links of a pair of folding links, which when the body is in its extended condition, are disposed at an angle to the perpendicular in substantially the same inclination as the side arms of the push handle. The top end of the top link is pivotally connected to the side member of the body top frame 26 and preferably one of the rivets 33ª employed in attaching the hood bracket 33 thereto, is used for this purpose. The bottom end of the bottom link is pivotally connected to the side member of the body bottom frame 27 as by a pin 41. The links 39—40 of each pair are substantially of the same length and their meeting ends are pivotally connected together by a pin 42.

The front end of a bar 43 is connected to the meeting ends of the links 39—40 by the same pin 42 which connects said meeting ends together. When the body is in its extended condition, this bar is horizontally disposed and its rear end is pivotally connected to the side arm 36 of the push handle by a pin 44. This same pin is employed to connect the bottom end of a third link 45 to the said handle arm. The top end of said link 45 is pivotally connected by a pin 46 to the rear end of the side member of the body top frame 26. This third link which has substantially the same inclination as the links 39—40, coacts with the link 39, the bar 43 and the side member of the body top frame 26, in forming a parallel motion arrangement. The link 45 carries a clip 47 to act as a stop for the side arm 36 of the push handle.

About midway between its ends, the bar 43 is provided with a depending bracket 48. A folding brace 49 with a rule joint 50 therein, is pivotally connected at its bottom end, to said bracket as at 51 and is pivotally connected at its top end to the push handle side arm 36 at a point 52 slightly above the top of the body.

In the plane of the bar 43 and arranged between the same and the body fabric 30 is a second bar 53, best shown in Fig. 6. The front end of said second bar has a down-turned end 54 which is pivotally connected as at 55 to the link 40 at a point a short distance below the pin 42. The rear end of said bar is turned upwardly to be pivotally connected to the third link 45 at a point between its ends by a pin 56. By the provision of the bent ends for said link actuating bar, the same may be better concealed from view behind the bar 43. However, even though said bar be extended in a straight line between the pins 55 and 56 it would function in the same manner. Near its front end, the bar 53 is provided with an outwardly extending stud 57, which in the collapsing or folding of the carriage is engaged by the edge of the link 39 to act as a stop therefor.

58 indicates a bar which is pivoted at one end to the front body supporting member 18 and is pivoted at its other end to the link 40 a short distance above the pin 41 by which said link is pivoted to the bottom frame of the body.

Figure 2:
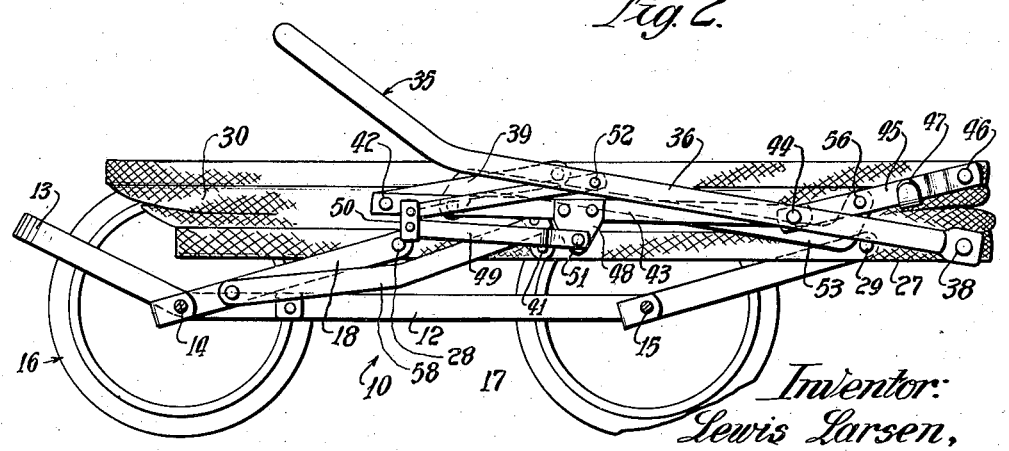
Fig. 2 is a view in side elevation of the carriage in its collapsed condition, the hood being omitted better to illustrate the position of the parts involved.

Assume that the parts are in the position shown in Fig. 1 wherein the carriage is in its extended condition, ready for use. It is to be noted that the folding brace 49 with the rule joint 50 therein is a trifle below center to lock the parts in this condition. To fold the carriage, the hood 34 is first folded down toward the front end of the body. The brace bars 49 are then broken upwardly at the joints 50. This swings the arms 36 of the handle forwardly and away from the stops 47 on the third link 45 previously engaged thereby. This breaking of the braces 49 also moves the meeting ends of the links 39—40 forwardly, thus breaking the straight line arrangement of these two links. At this time, the cross bar or hand hold 37 of the handle 35 is swung forwardly and downwardly. This movement of the handle causes the bars 43 to move forwardly and causes the links 39 and 45 to swing forwardly and upwardly with a parallel motion. During this movement of said handle and links, the links 40 swing forwardly and downwardly. Due to the angular arrangement of the braces 58 the pivot for the top ends thereof remain substantially stationary so that the links 40 tend to impart a rearward movement to the body as a whole. In this rearward movement of the body, the supporting members 18 for the body swing out of their perpendicular planes, rearwardly and downwardly. When said members 18 reach an angular position, which is overcome by the gravity effect or weight of the body, said members swing downwardly into substantially a horizontal position to fold the body down upon the frame 11. During the downward and rearward movement of the supporting members 18, the links 39—40 fold toward each other and almost into a horizontal position as shown in Fig. 2. The links 45 of course follow the movements of the links 39 with a parallel motion, so that the top frame 26 of the body folds down upon the bottom frame 27 and the body fabric 30 folds as pleats between said frames. When the carriage is folded the cross bar 37 of the handle overhangs the front end of the body and the hood which has previously been folded down thereon. The carriage is now in a condition of its least dimensions wherein it occupies but a minimum amount of space.

To open up or extend the carriage, it is only necessary to swing the handle 35 upwardly and rearwardly. In the initial part of this movement of the handle the braces 49 unfold and through the bars 43 tend to unfold and straighten out the links 39—40 and 45. As the braces 49 straighten out, a lifting action is imparted to the bars 43 which operate to swing the entire body upwardly away from the frame 11, the supporting members 18 swinging upwardly and forwardly toward and into substantially their perpendicular positions.

In the final part of the upward and rearward swing of the handle, the bars 43 move upwardly and rearwardly, swinging the links 39—40 into a substantially straight line, the links 45 following the links 39 in this movement. During this movement of the links, this lifts the top frame 26 of the body upwardly and the braces 49 then substantially straighten out. Thereafter, pressure on the joints 50 thereof swing the brace parts past center to lock the linkage in a position holding the body extended. In the movement of the links, the members 58 operate upon the front supporting members 18 to swing them into a perpendicular position. It is pointed out that when the carriage is in its extended condition, as the joint of said braces 49 have been swung past center, they cannot open or fold unless manually actuated.

The carriage is simple in construction and is easy to manipulate in folding the same and in opening the same into its extended condition.

While in describing the invention, I have referred in detail to the form, arrangement and construction of the various parts thereof, the same is to be considered only in the illustrative sense so that I do not wish to be limited thereto except as may be specifically set forth in the appended claims.

I claim as my invention:

1. A baby carriage embodying therein a body including a bottom, a top frame and a flexible body fabric therebetween, front and rear wheel carrying axles operatively connected together, front and rear pairs of supporting members, pivotally connected to said axles and to said bottom respectively, means including front and rear pairs of folding linkage, between said bottom and said top frame and operative to permit collapse of the body upon said bottom, and means connecting a part of the linkage of one of the pair thereof with one of the pairs of supporting members and operative in the collapse of the body to swing said one of said pairs of supporting members forwardly to fold the collapsed body down upon the wheel carrying axles.

2. A baby carriage embodying therein a body including a bottom, a top frame and a flexible body fabric therebetween, front and rear wheel carrying axles operatively connected together, front and rear pairs of supporting members, pivotally connected to said axles and to said bottom respectively, means including front and rear pairs of folding linkage pivotally connected at its opposite ends to said bottom and to said top frame respectively and operative to permit collapse of the body upon its bottom, and means connecting a part of the linkage of one of the pairs thereof at above the connection thereof with said bottom, with a pair of associated supporting members and operative in the collapse of the body to swing said supporting members forwardly to fold the collapsed body down upon said wheel carrying axles.

3. In a baby carriage, a wheel frame, a collapsible body including rigid top and bottom frames of substantially the same size and shape and a foldable fabric therebetween, means connecting the wheel frame and bottom frame of the body for supporting the body therefrom, a push handle pivotally connected to the bottom frame of the body, front and rear pairs of foldable links between the top and bottom frames of the body, a bar connecting one link of one pair to the other link of the other pair, and a foldable brace between said bar and handle for locking the said pairs of links in a position holding the body in the extended condition.

4. In a baby carriage, a wheel frame, a collapsible body including rigid top and bottom frames of substantially the same size and shape and a foldable fabric therebetween, means connecting the wheel frame and the bottom frame of the body for supporting the body therefrom, a push handle pivotally connected to the bottom frame of the body, front and rear pairs of foldable links between the top and bottom frames of the body, a part of the handle forming a part of the linkage of the rear pair, a bar connecting one link of one pair with the other link of the other pair, and a foldable brace between said bar and handle for locking the pairs of links in a position holding the body in its extended condition.

5. In a baby carriage, a wheel frame, a collapsible body including rigid top and bottom frames and a foldable fabric therebetween, means connecting the wheel frame and the bottom frame of the body for supporting the body therefrom, a push handle pivotally connected to the bottom frame of the body, a pair of top and bottom foldable links pivoted to the mid portion of said top and bottom frames and to each other, a third link pivoted to the top frame of the body and to the handle respectively, so that a part of said handle coacts with the third link in providing a second pair of foldable links, a bar connecting one link of one pair to the other link of the other pair, and a foldable brace between said bar and handle for locking the said pairs of links in a position holding the body in its extended position.

6. In a baby carriage, a wheel frame, a collapsible body including rigid top and bottom frames and a foldable fabric therebetween, means connecting the wheel frame and the bottom frame of the body for supporting the body therefrom, a push handle pivotally connected to the bottom frame of the body, a pair of top and bottom foldable links pivoted to the mid portion of said top and bottom frames and to each other, a third link pivoted to the top frame of the body and to the handle respectively, so that a part of said handle coacts with the third link in providing a second pair of foldable links, a stop on said third link adapted to be engaged by said handle to limit the rearward swinging movement thereof, a bar connecting the said pairs of links together, and a foldable brace between said bar and handle for locking the pairs of links in a position holding the body in its extended condition.

7. In a baby carriage, a wheel frame, a collapsible body including rigid top and bottom frames and a foldable fabric therebetween, means connecting the wheel frame and the bottom frame of the body for supporting the body therefrom, a push handle pivotally connected to the bottom frame of the body, top and bottom links pivoted to the mid portion of said top and bottom frames and to each other, a third link pivoted to the top frame of the body and to the handle respectively, so that a part of said handle coacts with the third link in providing a coacting bottom link therefor, a bar connecting the pivotal meeting points of said top and bottom links with the pivotal point between said third link and said handle, a second bar pivotally connected at its ends to said first mentioned bottom link and to said third link, a foldable brace between said first mentioned bar and said handle for locking said links in a position holding the body in its extended condition, and a stop on said third link adapted to receive said handle when said body is in its extended condition.

8. In a baby carriage, a wheel frame, a collapsible body including rigid top and bottom frames of substantially the same size and shape and a fabric therebetween, normally upright body supporting members having a pivotal connection with longitudinal spaced portions of the wheel frame and with the bottom frame of the body respectively, a push handle pivotally connected to the bottom frame of the body, foldable means comprising pairs of links pivotally connected to each other and to the top and bottom frames of the body for holding the latter in its extended condition, means connecting said pairs of links together, a foldable brace between said handle and a part of said connecting means respectively, for holding said pairs of links in body extending condition and for holding the handle in a position of use, and means pivotally connected to one of the links of one of said pairs and to one of said body supporting members for holding the latter in their upright position.

9. In a baby carriage, a wheel frame, wheel receiving front and rear axles operatively secured in said wheel frame, a collapsible body including rigid top and bottom frames of substantially the same size and shape, and a fabric therebetween, normally upright front and rear body supporting members journalled on said axles and pivotally connected to the bottom frame of the body, a push handle pivotally connected to the bottom frame of the body, foldable means comprising pairs of foldable links connected to each other and to the top and bottom frames of the body for holding the latter in its extended condition, means connecting said pairs of links together, a foldable brace between the handle and a part of said connecting means respectively, for holding said pairs of links in body extending condition and for holding the handle in a position of use, and means pivotally connected to one of the links of one of said pairs and to one of said body supporting members for holding the latter in their upright position.

10. In a baby carriage, a wheel frame, a collapsible body including rigid top and bottom frames of substantially the same size and shape, and a fabric therebetween, normally upright body supporting members having a pivotal connection with longitudinal spaced portions of the wheel frame and with the bottom frame of the body respectively, a push handle pivotally connected to the bottom frame of the body, front and rear sets of foldable linkage between the top and bottom frames of the body, a bar connecting said front and rear sets of linkage, a foldable brace between said bar and handle for locking the linkage in a position holding the body in the extended condition, and means pivotally connected to a part of said foldable linkage and to one of said body supporting members for holding the latter in their upright condition.

11. In a baby carriage, a wheel frame, a collapsible body including rigid top and bottom frames of substantially the same size and shape and a fabric therebetween, normally upright members having a pivotal connection with longitudinal spaced portions of the wheel frame and with the bottom frame of the body respectively, for supporting the body from the wheel frame, a push handle pivotally connected to the bottom frame of the body, front and rear sets of foldable linkage between the top and bottom frames of the body, a part of the handle forming a part of the linkage of the rear set, a bar connecting the front and rear sets of linkage, a foldable brace between said bar and handle for locking the linkage in a position holding the body in its extended condition, and means pivotally connected to a part of said foldable means and to one of said normally upright members for holding the latter in their upright condition.

LEWIS LARSEN.